US012274649B1

(12) United States Patent
Thomas

(10) Patent No.: US 12,274,649 B1

(45) Date of Patent: Apr. 15, 2025

(54) MOTORIZED COFFIN LID DEVICE

(71) Applicant: Timothy Thomas, Ypsilanti, MI (US)

(72) Inventor: Timothy Thomas, Ypsilanti, MI (US)

(*) Notice: Subject to any disclaimer, the term of this patent is extended or adjusted under 35 U.S.C. 154(b) by 0 days.

(21) Appl. No.: 18/515,501

(22) Filed: Nov. 21, 2023

(51) Int. Cl.
*A61G 17/02* (2006.01)

(52) U.S. Cl.
CPC ........ *A61G 17/028* (2017.05); *A61G 2203/12* (2013.01)

(58) Field of Classification Search
CPC .... A61G 17/028; A61G 17/02; A61G 17/032; A61G 17/0405; A61G 2203/12; E05F 3/20; E05F 15/77; E05F 15/614; E05F 15/603; B65F 1/1638
See application file for complete search history.

(56) References Cited

U.S. PATENT DOCUMENTS 601,037 A * 3/1898 Garrison .............. A61G 17/028 27/18
843,157 A * 2/1907 Lawson ............... A61G 17/028 27/4
1,378,298 A * 5/1921 Watts ................... A61G 17/032 217/60 D
1,934,635 A * 11/1933 Davoran .............. A61G 17/028 27/14
2,156,872 A * 5/1939 Roberts ................ A61G 17/032 27/18
2,848,783 A * 8/1958 Keller, Jr. .......... A61G 17/0405 292/276
3,060,546 A * 10/1962 Nelson ................. A61G 17/032 27/18
3,065,517 A * 11/1962 Dower ................. A61G 17/036 277/648
3,151,375 A * 10/1964 Schevenell .......... A61G 17/032 27/16
3,490,114 A * 1/1970 Connelly ........... A61G 17/0073 D99/7
3,545,056 A * 12/1970 Schevenell .......... A61G 17/028 27/16
3,959,859 A * 6/1976 Stein, Jr. .............. A61G 17/032 27/18
4,177,543 A * 12/1979 Angermann ......... A61G 17/004 27/35
4,360,953 A * 11/1982 Angermann ......... A61G 17/032 27/14
4,524,496 A * 6/1985 Tehsildar ............. A61G 17/032 403/92
4,722,116 A 2/1988 Erickson
4,788,757 A 12/1988 Bethune
(Continued)

FOREIGN PATENT DOCUMENTS

WO WO9844230 10/1998

*Primary Examiner* — William L Miller

(57) ABSTRACT

A motorized coffin lid device for remotely opening a lid of the casket includes a coffin having a bottom wall and a peripheral wall that is attached to and extends upwardly from the bottom wall to define an interior space. The peripheral wall has an upper edge to define an opening into the interior space. A lid is pivotably coupled to the upper edge to selectively open and close the opening. A motor is coupled to the coffin and positioned in the interior space. A lift mechanism is coupled to the motor. The motor actuates the lift mechanism to pivot the lid and to selectively open and close the opening. A power source is electrically coupled to the motor.

8 Claims, 5 Drawing Sheets

(56) References Cited

U.S. PATENT DOCUMENTS

| | | | | | |
|---|---|---|---|---|---|
| 4,962,574 | A * | 10/1990 | Estes | A61G 17/028 27/19 |
| 5,507,070 | A | 4/1996 | Spyche | |
| 5,570,493 | A * | 11/1996 | Gulick | A61G 17/028 27/14 |
| 5,709,016 | A * | 1/1998 | Gulick | A61G 17/004 27/14 |
| 5,765,268 | A * | 6/1998 | MacKirdy | A61G 17/032 27/18 |
| 6,061,964 | A | 5/2000 | Arnell | |
| 6,891,479 | B1 | 5/2005 | Eccleston | |
| 7,472,462 | B1 * | 1/2009 | Parker | A61G 17/04 27/19 |
| 9,080,366 | B2 * | 7/2015 | Schiegel | E05F 15/40 |
| 9,260,899 | B2 * | 2/2016 | Loeffler | E05F 1/1041 |
| D758,165 | S | 6/2016 | Grundy | |
| 9,895,278 | B2 * | 2/2018 | Socha | A61G 17/0106 |
| 11,299,923 | B2 * | 4/2022 | Seidl | H02J 50/10 |
| 11,497,335 | B2 * | 11/2022 | Romanucci | B64F 1/32 |
| 2009/0282658 | A1 * | 11/2009 | Bovard | E05D 7/0009 27/16 |
| 2011/0271595 | A1 * | 11/2011 | Eggeling | E05F 15/611 49/358 |
| 2012/0174356 | A1 * | 7/2012 | Laking | A61G 17/02 27/12 |
| 2012/0260476 | A1 * | 10/2012 | Burnside | A61G 17/007 27/16 |
| 2014/0238986 | A1 * | 8/2014 | Crawford | B65F 1/1638 220/211 |
| 2019/0000255 | A1 * | 1/2019 | Dehner | B65D 43/26 |

* cited by examiner

MOTORIZED COFFIN LID DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to caskets and more particularly pertains to a new casket for remotely opening a lid of the casket.

(2) Description of Related Art Including Information Disclosed Under 37 CFR 1.97 and 1.98

The prior art relates to caskets. Caskets include heavy lids which may be opened temporarily, for example during a funeral or wake to facilitate viewing the body of a deceased loved one before burial. The last viewing can be an emotional moment for friends and family of the deceased. Funeral directors or other individuals need to physically walk up to the casket to open and close the lid. This can interrupt the grieving process for the friends and family. Manually lifting the lid can also be difficult, because casket lids can be very heavy. For example, a wooden casket can weigh between 150 and 250 pounds, or more, and a metal casket can weigh 200 pounds or more. Lifting the lid of the casket can be physically demanding on the funeral director. Thus, there is a need in the art for an automated or mechanical means of opening the lid of the casket from a remote location.

BRIEF SUMMARY OF THE INVENTION

An embodiment of the disclosure meets the needs presented above by generally comprising a coffin having a bottom wall and a peripheral wall that is attached to and extends upwardly from the bottom wall to define an interior space. The peripheral wall has an upper edge to define an opening into the interior space. A lid is pivotably coupled to the upper edge to selectively open and close the opening. A motor is coupled to the coffin and positioned in the interior space. A lift mechanism is coupled to the motor. The motor actuates the lift mechanism to pivot the lid and to selectively open and close the opening. A power source is electrically coupled to the motor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
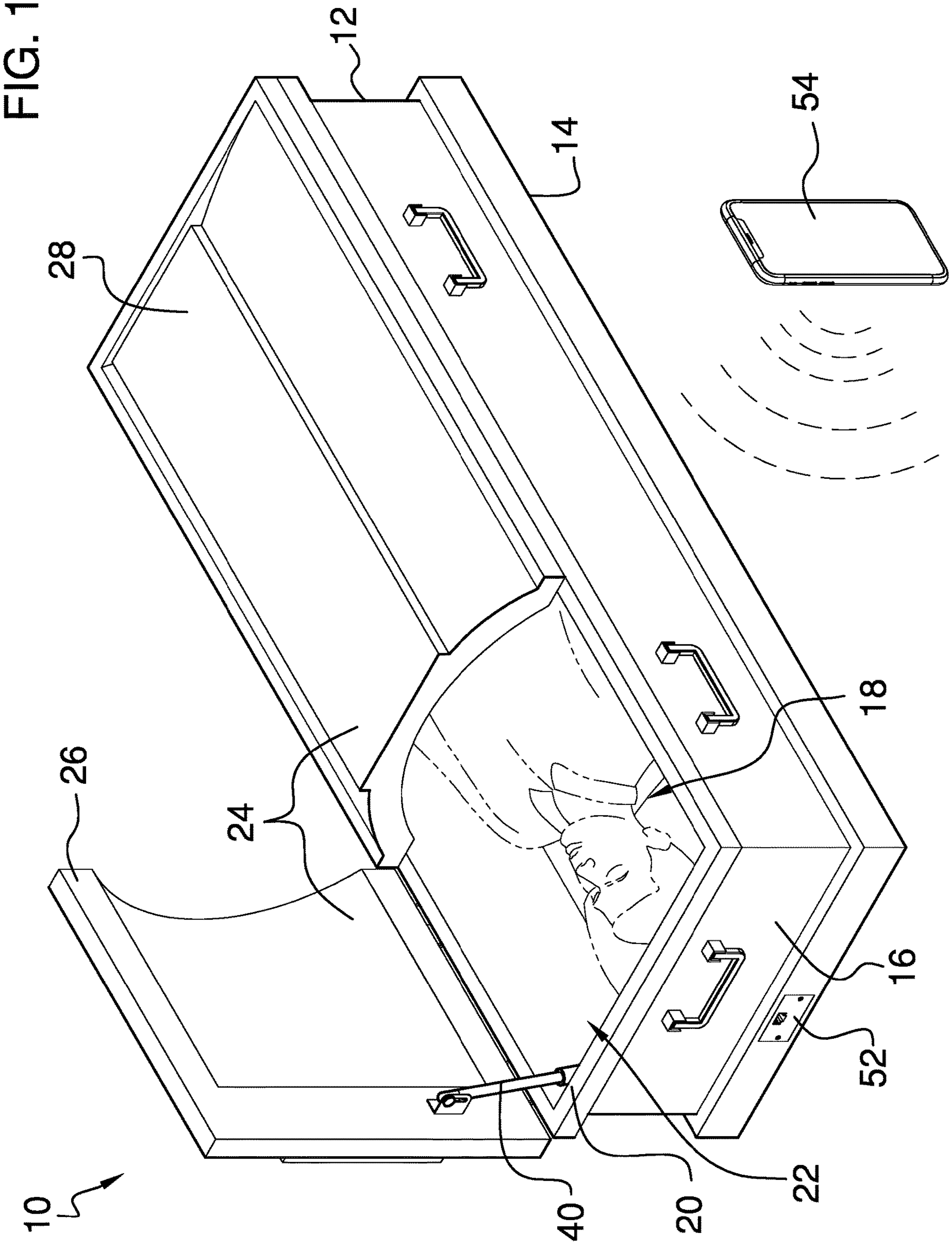
FIG. 1 is an isometric view of a motorized coffin lid device according to an embodiment of the disclosure.
Figure 2:
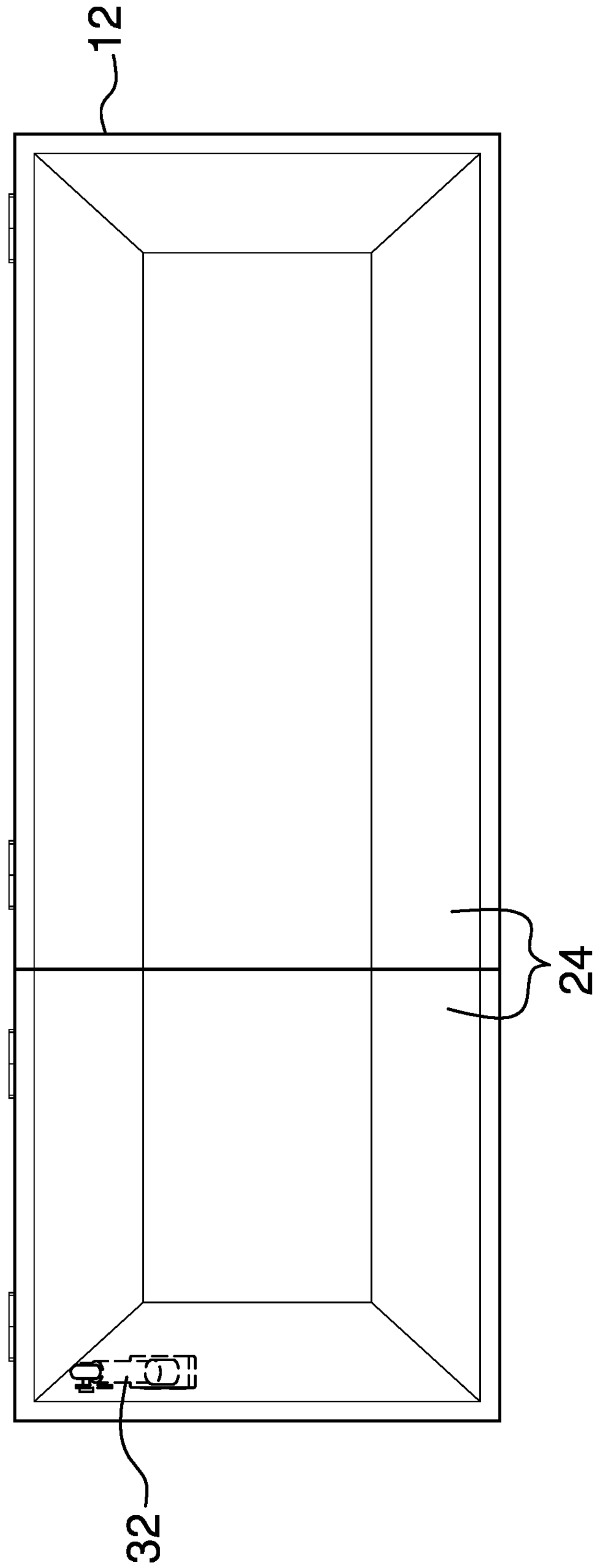
FIG. 2 is a top view of an embodiment of the disclosure.
Figure 3:
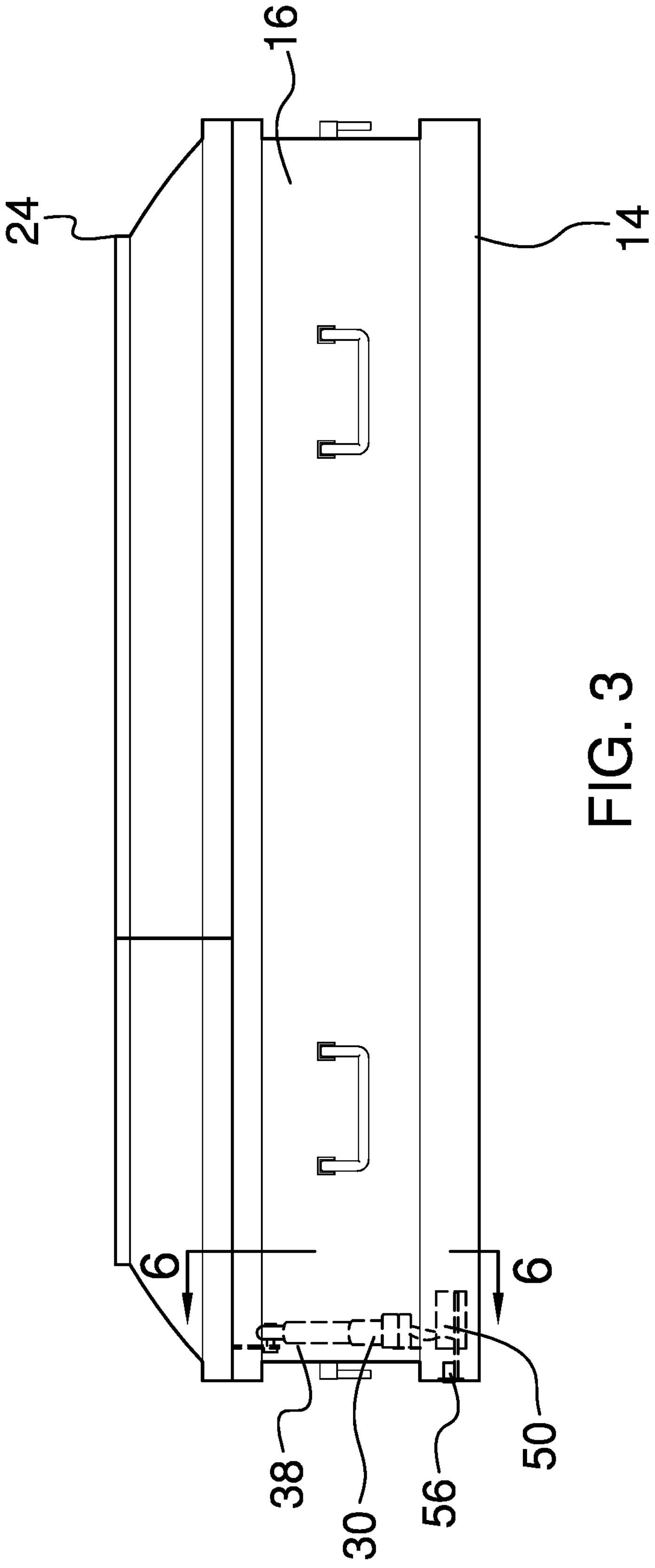
FIG. 3 is a front view of an embodiment of the disclosure.
Figure 5:
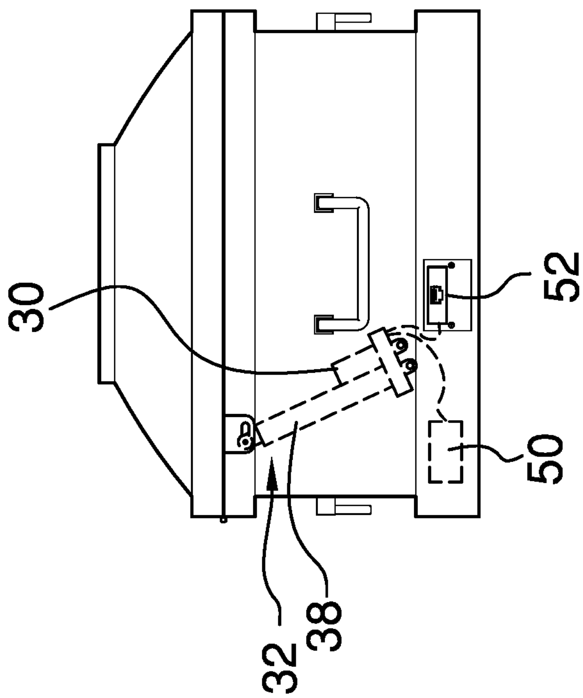
FIG. 5 is a side view of an embodiment of the disclosure.
Figure 4:
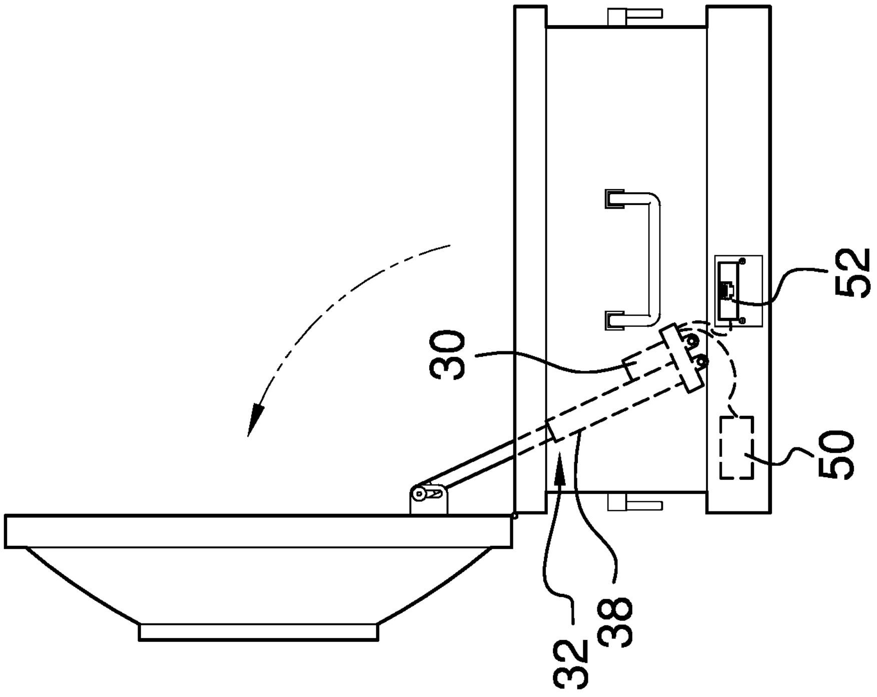
FIG. 4 is a side view of an embodiment of the disclosure.
Figure 6:
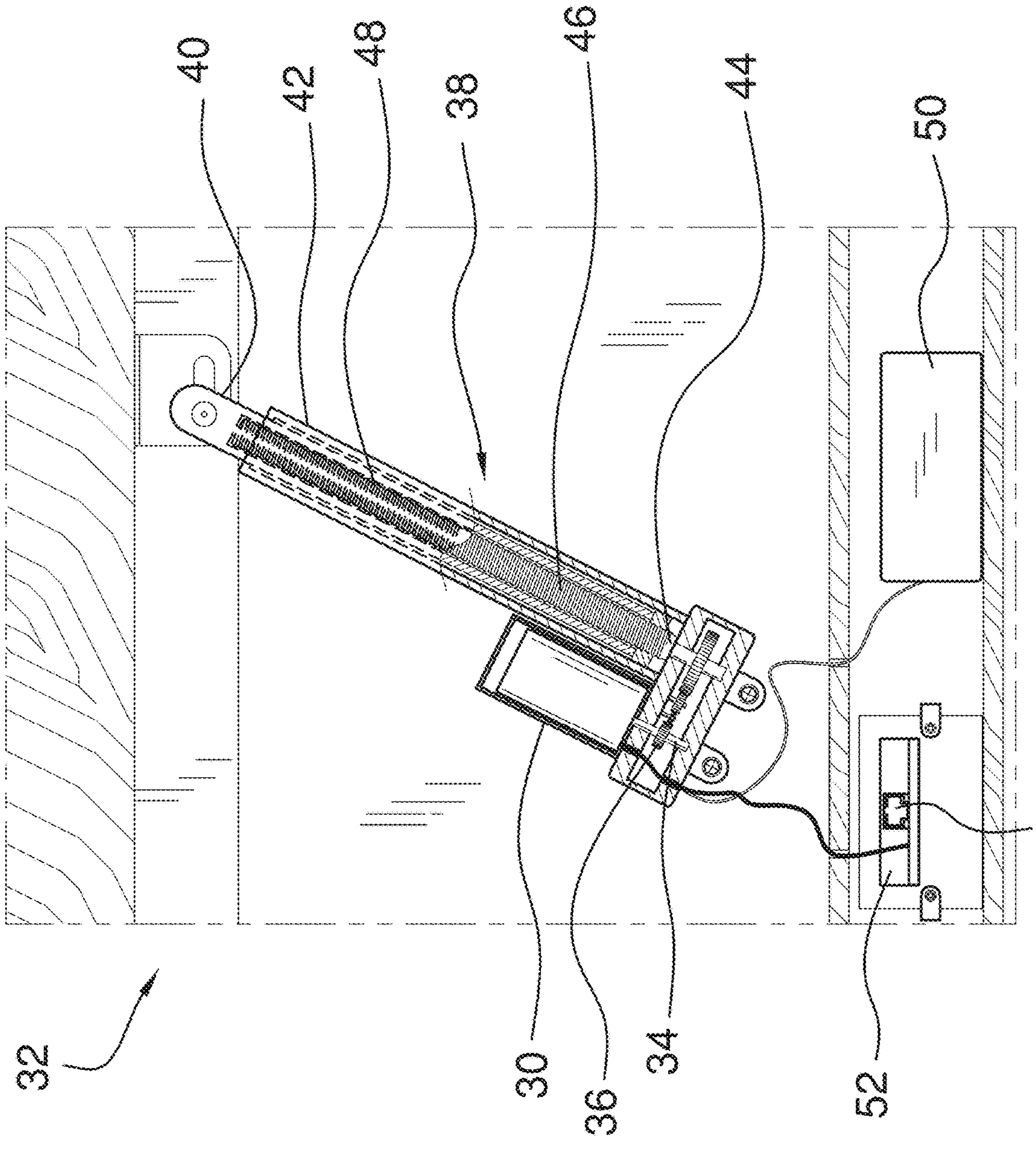
FIG. 6 is a detail view of an embodiment of the disclosure.

With reference now to the drawings, and in particular to FIGS. 1 through 6 thereof, a new casket embodying the principles and concepts of an embodiment of the disclosure and generally designated by the reference numeral 10 will be described.

As best illustrated in FIGS. 1 through 6, the motorized coffin lid device 10 generally comprises a coffin 12 having a bottom wall 14 and a peripheral wall 16 that is attached to and extends upwardly from the bottom wall 14 to define an interior space 18. The peripheral wall 16 has an upper edge 20 that defines an opening 22 into the interior space 18.

A lid 24 is pivotably coupled to the upper edge 20 to selectively open and close the opening 22. The lid 24 may be a single piece or may include a first lid section 26 and a second lid section 28 that are each openable independently of the other.

A motor 30 is coupled to the coffin 12. The motor 30 is generally positioned in the interior space 18. Embodiments of the motor 30 may comprise a rotation motor.

A lift mechanism 32 is coupled to the motor 30. The lift mechanism 32 is generally positioned in the interior space 18. The motor 30 actuates the lift mechanism 32 to pivot the lid 24 to selectively open and close the opening 22.

The lift mechanism may include an output shaft 34 that extends outwardly from the motor 30. The motor 30 is actuatable to rotate the output shaft 34 in a first direction to open the lid 24 and is actuatable to rotate the output shaft 34 in a second direction to close the lid 24.

A gear train 36 may be coupled to the output shaft 34. The gear train 36 may rotate in the first direction when the motor

30 rotates the output shaft 34 in the first direction. The gear train 36 may rotate in the second direction when the motor 30 rotates the output shaft 34 in the second direction.

An arm 38 may be coupled to the gear train 36 and the lid 24. Generally, the arm 38 extends upwardly to open the lid 24 when the motor 30 rotates the output shaft 34 in the first direction and retracts downwardly to close the lid 24 when the motor 30 rotates the output shaft 34 in the second direction.

The arm 38 may include a first shaft 40 that is telescopically coupled to a second shaft 42. The first shaft 40 is nested in the second shaft 42 whereby the first shaft 40 is extendable relative to the second shaft 42.

A lead screw 44 may be coupled to the gear train 36, for example being positioned within the second shaft 42. The lead screw 44 may include a lead threading 46. The first shaft 40 may include a shaft threading 48. The lead threading 46 is complementary to the shaft threading 48 whereby the first shaft 40 is threadably coupled to the lead screw 44. The gear train 36 moves in the first direction to rotate the lead screw 44 and move the first shaft 40 upwardly along the lead screw 44 thereby pivoting the lid 24 upwardly to open the opening 22. The gear train 36 rotates in the second direction to rotate the lead screw 44 and move the first shaft 40 downwardly along the lead screw 44 thereby pivoting the lid 24 downwardly to close the opening 22.

In embodiments with the first lid section 26 and the second lid section 28, the first shaft 40 is coupled to the first lid section 26 whereby the first lid section 26 is openable when the second lid section 28 is closed.

A power source 50 is generally electrically coupled to the motor 30. For example, the power source 50 may be a battery.

A network interface controller 52 may be removably positionable in the peripheral wall 16. The network interface controller 52 is electronically coupled to the motor 30. The network interface controller 52 is configured to wirelessly communicate with an external electronic device 54 to selectively actuate the motor 30 thereby pivoting the lid 24 upwardly to open the opening 22 and downwardly to close the opening 22.

A data port 56 may be inset into the network interface controller 52 and exposed within the network interface controller 52. The data port 56 is configured to receive a data cord for wirelessly connecting the network interface controller 52 to the external electronic device 54.

In use, a user can actuate the motor 30 using the external electronic device 54. For example, the external electronic device 54 may include a user interface that signals the network interface controller 52 to actuate the motor 30. The motor 30 can actuate the lift mechanism 32 to raise or lower the lid 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorized coffin cover assembly comprising:

a coffin having a bottom wall and a peripheral wall being attached to and extending upwardly from the bottom wall to define an interior space for receiving a body of a deceased, the peripheral wall having an upper edge to define an opening into the interior space;

a lid being pivotably coupled to the upper edge to selectively open and close the opening;

a motor being coupled to the coffin;

a lift mechanism being coupled to the motor and being positioned in the interior space, wherein the motor actuates the lift mechanism to pivot the lid to selectively open and close the opening;

a power source being electrically coupled to the motor; and a network interface controller being removably positionable in the peripheral wall, the network interface controller being electronically coupled to the motor, the network interface controller being configured to wirelessly communicate with an external electronic device to selectively actuate the motor thereby pivoting the lid upwardly to open the opening and downwardly to close the opening.

2. The motorized coffin cover assembly of claim 1, wherein the motor is a rotation motor.

3. The motorized coffin cover assembly of claim 1, the power source further comprising a battery.

4. The motorized coffin cover assembly of claim 1, further comprising a data port being inset into the network interface controller and being exposed within the network interface controller, the data port being configured to receive a data cord for wirelessly connecting the network interface controller to the external electronic device.

5. A motorized coffin cover assembly comprising:

a coffin having a bottom wall and a peripheral wall being attached to and extending upwardly from the bottom wall to define an interior space for receiving a body of a deceased, the peripheral wall having an upper edge to define an opening into the interior space;

a lid being pivotably coupled to the upper edge to selectively open and close the opening;

a motor being coupled to the coffin;

a lift mechanism being coupled to the motor and being positioned in the interior space, wherein the motor actuates the lift mechanism to pivot the lid to selectively open and close the opening;

a power source being electrically coupled to the motor; and the lift mechanism further comprising:

an output shaft extending outwardly from the motor, the motor being actuatable to rotate the output shaft in a first direction to open the lid and being actuatable to rotate the output shaft in a second direction to close the lid;

a gear train being coupled to the output shaft, wherein the gear train rotates in the first direction when the motor rotates the output shaft in the first direction, and wherein the gear train rotates in the second direction when the motor rotates the output shaft in the second direction; and an arm being coupled to the gear train and the lid, wherein the arm extends upwardly to open the lid when the motor rotates the output shaft in the first direction, and wherein the arm retracts downwardly to close the lid when the motor rotates the output shaft in the second direction.

6. The motorized coffin cover assembly of claim 5, the arm further comprising:

a first shaft being telescopically coupled to a second shaft, the first shaft being nested in the second shaft whereby the first shaft is extendable relative to the second shaft; and a lead screw being coupled to the gear train, the lead screw being positioned within the second shaft, the lead screw having a lead threading, the first shaft having a shaft threading, the lead threading being complementary to the shaft threading whereby the first shaft is threadably coupled to the lead screw, wherein the gear train moves in the first direction to rotate the lead screw and move the first shaft upwardly along the lead screw thereby pivoting the lid upwardly to open the opening, and wherein the gear train rotates in the second direction to rotate the lead screw and move the first shaft downwardly along the lead screw thereby pivoting the lid downwardly to close the opening.

7. The motorized coffin cover assembly of claim 6, the lid further comprising a first lid section and a second lid section, each of the first lid section and the second lid section being openable independently of the other, wherein the first shaft is coupled to the first lid section whereby the first lid section is openable when the second lid section is closed.

8. A motorized coffin cover assembly comprising:

a coffin having a bottom wall and a peripheral wall being attached to and extending upwardly from the bottom wall to define an interior space for receiving a body of a deceased, the peripheral wall having an upper edge to define an opening into the interior space;

a lid being pivotably coupled to the upper edge to selectively open and close the opening, the lid including:

a first lid section and a second lid section, each of the first lid section and the second lid section being openable independently of the other;

a motor being coupled to the coffin, the motor being positioned in the interior space, the motor being a rotation motor;

a lift mechanism being coupled to the motor, wherein the motor actuates the lift mechanism to pivot the lid to selectively open and close the opening, the lift mechanism comprising:

an output shaft extending outwardly from the motor, the motor being actuatable to rotate the output shaft in a first direction to open the lid and being actuatable to rotate the output shaft in a second direction to close the lid;

a gear train being coupled to the output shaft, wherein the gear train rotates in the first direction when the motor rotates the output shaft in the first direction, and wherein the gear train rotates in the second direction when the motor rotates the output shaft in the second direction;

an arm being coupled to the gear train and the lid, wherein the arm extends upwardly to open the lid when the motor rotates the output shaft in the first direction, and wherein the arm retracts downwardly to close the lid when the motor rotates the output shaft in the second direction, the arm including:

a first shaft being telescopically coupled to a second shaft, the first shaft being nested in the second shaft whereby the first shaft is extendable relative to the second shaft;

a lead screw being coupled to the gear train, the lead screw being positioned within the second shaft, the lead screw having a lead threading, the first shaft having a shaft threading, the lead threading being complementary to the shaft threading whereby the first shaft is threadably coupled to the lead screw, wherein the gear train moves in the first direction to rotate the lead screw and move the first shaft upwardly along the lead screw thereby pivoting the lid upwardly to open the opening, and wherein the gear train rotates in the second direction to rotate the lead screw and move the first shaft downwardly along the lead screw thereby pivoting the lid downwardly to close the opening;

wherein the first shaft is coupled to the first lid section whereby the first lid section is openable when the second lid section is closed;

a power source being electrically coupled to the motor, the power source comprising a battery;

a network interface controller being removably positionable in the peripheral wall, the network interface controller being electronically coupled to the motor, the network interface controller being configured to wirelessly communicate with an external electronic device to selectively actuate the motor thereby pivoting the lid upwardly to open the opening and downwardly to close the opening; and a data port being inset into the network interface controller and being exposed within the network interface controller, the data port being configured to receive a data cord for wirelessly connecting the network interface controller to the external electronic device.

* * * * *